United States Patent [19]

Harvey

[11] Patent Number: 5,040,440
[45] Date of Patent: Aug. 20, 1991

[54] PRODUCT SWITCHING MECHANISM

[75] Inventor: George R. Harvey, Burlington, Canada

[73] Assignee: Stelco, Inc., Ontario, Canada

[21] Appl. No.: 521,324

[22] Filed: May 9, 1990

[51] Int. Cl.⁵ .................. B23D 25/08; B23D 33/02
[52] U.S. Cl. ............................. 83/106; 209/657;
                                                209/698; 83/157
[58] Field of Search ............... 83/102, 105, 106, 156,
                                    83/157, 99, 100; 209/657, 698

[56] References Cited

U.S. PATENT DOCUMENTS

| | | | |
|---|---|---|---|
| 3,258,951 | 7/1966 | Kinnicutt, Jr. et al. | 83/105 X |
| 3,261,247 | 7/1966 | Nargany et al. | 83/106 |
| 3,631,979 | 1/1972 | Frankiewicz et al. | 83/105 X |
| 3,834,260 | 9/1974 | Sieurin et al. | 83/106 |
| 4,041,819 | 8/1977 | Chu et al. | 83/102 X |
| 4,966,060 | 10/1990 | Poloni | 83/105 |

Primary Examiner—Z. R. Bilinsky
Attorney, Agent, or Firm—Shoemaker and Mattare, Ltd.

[57] ABSTRACT

A product switching mechanism, located downstream of a rotary shear for rod and bar product, includes first structure defining a horizontally elongate chamber with a top, bottom and one side wall, the chamber being open at the side opposite the one side wall, the chamber having one end remote from the rotary shear and another end adjacent the rotary shear with the one end being open; a second structure defining a substantially flat vertical surface closing the open side of the chamber and providing first and second substantially horizontal passages; the first passage is enclosed above, below and on either side and has a downstream opening and an upstream opening, the second passage having an upstream opening vertically adjacent the upstream opening of the first passage, the second passage opening through the surface of the second structure and having a side wall angling toward the surface as it extends away from the upstream opening of the second passage, so that product entering the upstream opening of the second passage is guided toward the first structure, the second structure being selectively movable with respect to the first to a position which is such that product moving in the second passage is guided into the chamber.

18 Claims, 4 Drawing Sheets

PRODUCT SWITCHING MECHANISM

This invention relates to a product switching mechanism adapted to receive steel rod and bar products downstream of a shearing mechanism, and for distributing such products (including samples, trim and the entire rod or bar) to one or more coilers, to a cooling bed, to a sample bin, or to a scrap bin.

BACKGROUND OF THIS INVENTION

In a typical rolling mill operation in the steel industry, it is frequently necessary to divide long pieces of rod or bar product into smaller lengths, and to pass these lengths to one or a plurality of disposal or process arrangements. As an example, long lengths of bar stock would typically be severed into a plurality of shorter lengths. Round (rod) stock could also be severed, depending upon its diameter, prior to coiling or delivery to a cooling bed.

The shearing of long lengths of rod or bar stock into shorter lengths represents one aspect of the shearing process. However, it is also necessary from time to time to take tail, nose and mid-bar samples from these products, and it is almost always necessary to remove a short piece at the nose and tail end of the full length product due to the fact that the end portions tend to be off-spec in terms of cross-sectional dimensions.

The prior art does not contain a fully versatile switching mechanism capable of differentially switching the various samples, trim pieces and main lengths of the product (for coiling or cooling bed). The following is a list of prior patents of interest:

Kinnicutt et al. U.S. Pat. No. 3,109,340, issued Nov. 5, 1963;
Kinnicutt et al. U.S. Pat. 3,258,951, issued July 5, 1966;
U.K. patent 1,302,503, Moeller & Neuman GmbH, published Jan. 10, 1973;
DD 112,914, issued Oct. 20, 1976 to Kurbis.

GENERAL DESCRIPTION OF THIS INVENTION

In view of the failure of the prior art to provide a fully versatile product switching mechanism for use for rod and bar products in the steel industry, it is an object of one aspect of this invention to provide such a mechanism which is safe and effective and which, through the swiveling movement of various parts thereof, allows a large number of choices in terms of the routing of various samples, trim pieces and full lengths.

More particularly, this invention provides, for use with a rotary shear for rod and bar product, a product switching mechanism comprising:

first means providing a substantially horizontally elongate chamber, defined by a top wall, a bottom wall and one side wall, the chamber being open at the side opposite said one side wall, said chamber having one end remote from the rotary shear and another end adjacent the rotary shear, said one end being open, second means defining a substantially flat, vertical surface closing the open side of said chamber, the second means further providing first and second substantially horizontal passages, the first passage being enclosed above, below and on either side and having a downstream opening and an upstream opening, the second passage having an upstream opening vertically adjacent the upstream opening of the first passage, the second passage opening through said surface of the second means and having a side wall angling toward said surface as it extends away from the upstream opening of the second passage, so that product entering the upstream opening of the second passage is guided toward said first means, the second means being selectively movable with respect to the first means to a position which is such that product moving in said second passage is guided into said chamber.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 2:
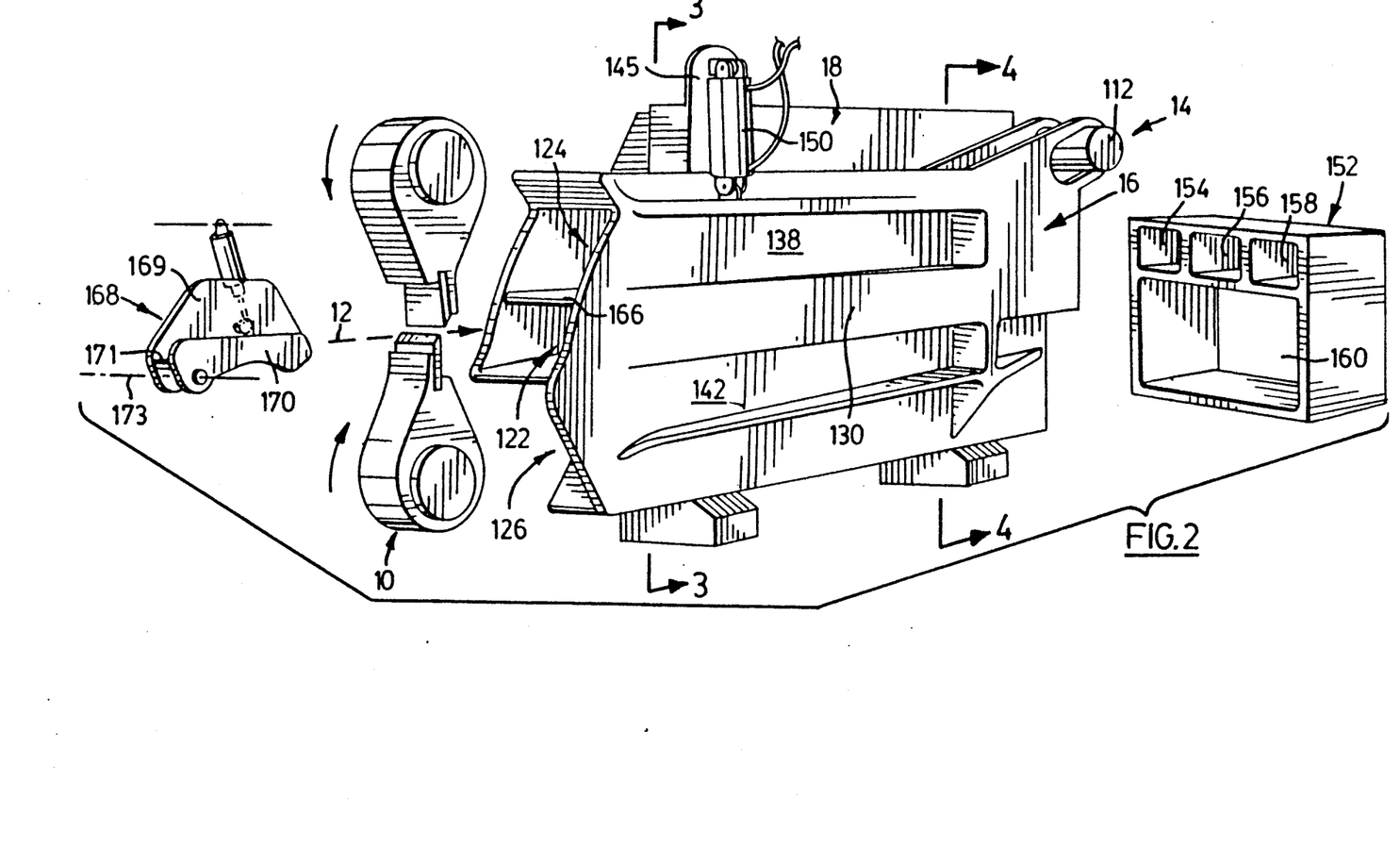
FIG. 2 is a perspective view of the two portions of FIG. 1 when in the assembled condition.
Figure 3:
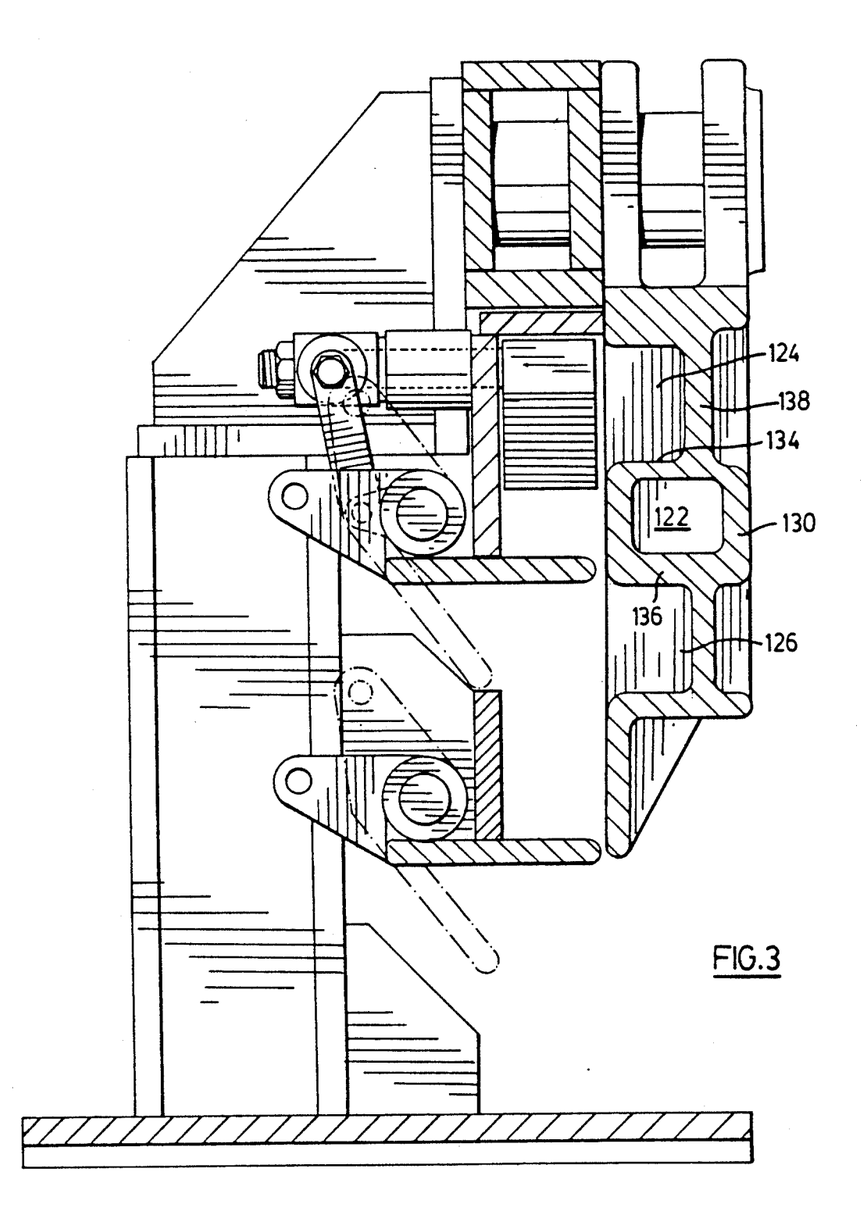
FIG. 3 is a lateral sectional view taken at the line 3—3 in FIG. 2.

In FIG. 2, a rotary shear is shown generally at the numeral 10, it being understood that the rotary shear 10 receives rod or bar product from a rolling train situated to the left of the rotary shear 10 but not visible in the figure. The product is moving left to right along the pass line 12.

Immediately downstream of the rotary shear 10 there is located a product switching mechanism generally designated by the numeral 14.

Figure 1:
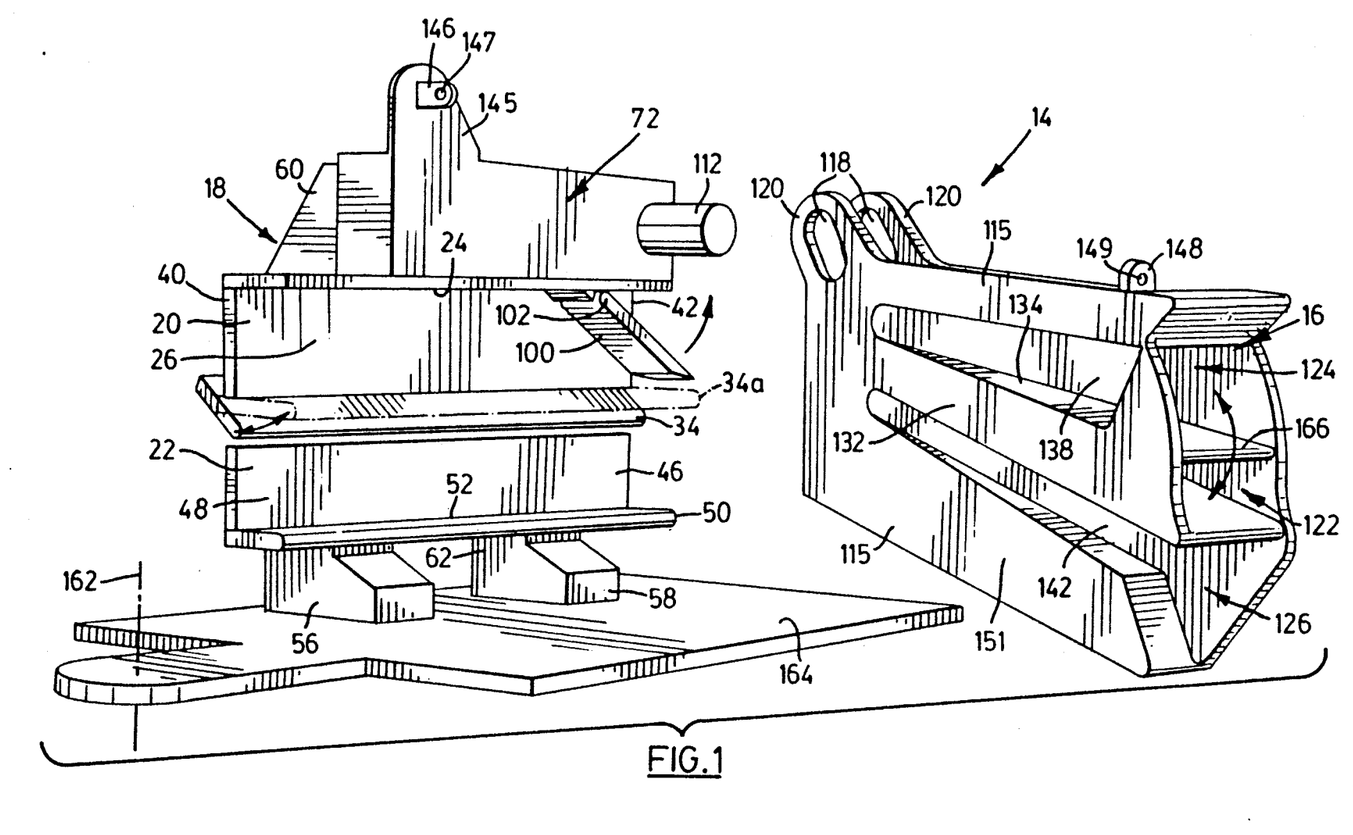
FIG. 1 is a perspective view of the mechanism of this invention, with two major portions separated left to right, showing the sides of the two portions which are in surface contact when assembled.

Looking particularly at FIG. 1, it will be seen that the product switching mechanism 14 consists essentially of a first assembly 16 and a second assembly 18. The second assembly 18 is configured to provide a first substantially horizontally elongate chamber 20 and a second substantially horizontally elongate chamber 22.

Figure 4:
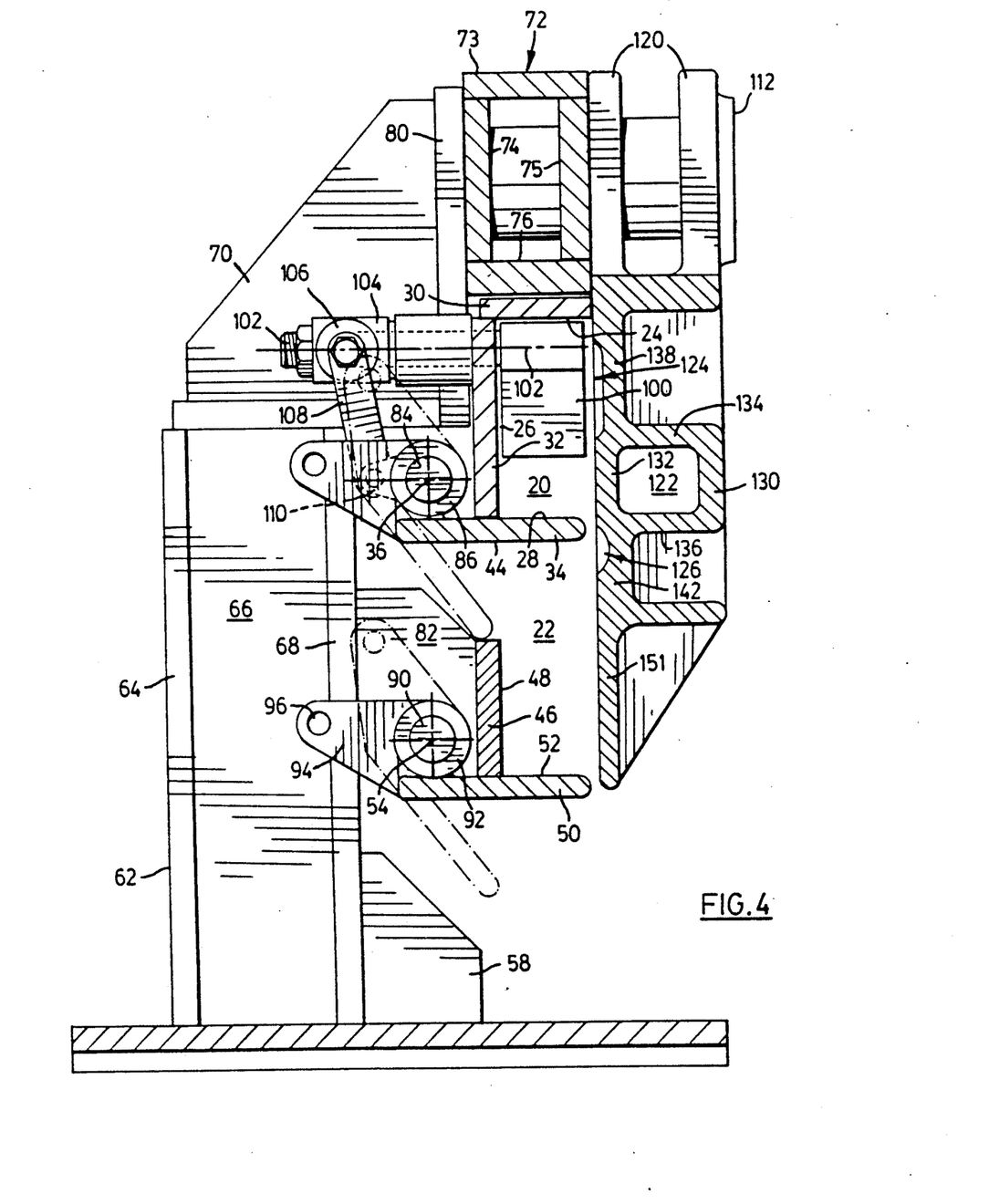
FIG. 4 is a lateral sectional view taken at the line 4—4 in FIG. 2.

The first chamber 20 is defined by a top wall 24, one side wall 26, and a bottom wall 28 (see FIG. 4). The top wall 24 is the lower surface of a horizontal panel 30, and the side wall 26 is the rightward surface (seen in FIG. 4) of a vertical panel 32. The bottom wall 28 is the upper surface of a pivotally mounted flap 34 which is mounted to rotate about an axis 36 (see FIG. 4).

The first chamber 20 has an upstream end 40 (seen at the left in FIG. 1), and a downstream end 42. In the embodiment illustrated, both of the ends 40 and 42 are open.

The second chamber 22 is adjacently below the first chamber 20 and is divided therefrom by the flap 34 when it is in its horizontal position. The flap 34 is shown in the horizontal position in solid lines in FIG. 4, while in FIG. 1 it is the broken-line representation 34a that shows the horizontal position. The solid line representation in FIG. 1 shows the flap 3 in its retracted position.

When the flap 34 is in its horizontal position, its lower surface 44 defines the top wall of the chamber 22. A panel 46 has a rightward vertical surface 48 which defines one side wall of the second chamber 22. Finally, a second flap 50 is provided under the chamber 22, and defines by its upper surface 52 the bottom wall of the chamber 22, when the flap 50 is in its horizontal position as illustrated in solid lines in FIGS. 1 and 4.

The flap 50 can swing between the horizontal position shown in solid lines in FIG. 4 and the retracted, oblique position shown in broken lines in FIG. 4, rotating about an axis 54.

The portions just described, in particular the parts which define the first and second chambers 20 and 22, are supported on two pedestals 56 and 58 which form part of two columns 60 and 62 which are in spaced-apart relation and located remote from the viewer in FIG. 1. In FIG. 4, the column 62 is rectangular in horizontal section, and includes four vertically upright panels 64, and 68. The panels 64 and 68 are seen edge-on. The fourth panel (opposite the panel 66) is not visible in FIG. 4. Each column 60 and 62 supports two substantially triangular brackets 70, and each pair of brackets 70 supports a vertical plate 80. A horizontally elongate, box-like structure 72 consists of four panels 73, 74, 75 and 76, and is welded to the plate 80. The panel 30 is supported from the panel 76.

The panel 46 is supported from the columns 60 and 62 by the intermediary of two brackets 82 (see FIG. 4).

Defining the axis 36 is a pair of stub shafts 84, one being supported from each column. Around each stub shaft 84 is a sleeve 86 to which is secured the flap 34. The two sleeves are thus locked together by virtue of being secured to the flap 34.

Defining the axis 54 are two stub shafts 90 around which are journaled two sleeves 92, both of which are secured with respect to the flap 50. Thus the sleeves 92 move in tandem due to their securement to the flap 50. A suitable hydraulic or air cylinder (not illustrated) would be provided to rotate the sleeves 92 and flap 50 about the axis 54, through a connection to a bracket 94 having an aperture 96.

Before dealing with the movement of the flap 34 (the upper flap), attention is directed briefly to FIG. 1, which shows a deflector 100 mounted for rotation about an axis 102. The deflector 100 is adapted to move between its oblique position shown in FIG. 1, and a retracted position in which it is withdrawn partially upwardly (see FIG. 4). When it is in the position illustrated in FIG. 1, the deflector 100 is adapted to guide product downwardly. When it is in its retracted position, it does not interfere with the movement of product.

Attention is now directed again to FIG. 4, to show that the movement of the flap 34 is directly tied to the movement of the deflector 100. As can be seen, the deflector 100 is solidly connected to a shaft 102 to which is securely fixed a sleeve 104 from which an arm 106 projects toward the viewer in FIG. 4. At the end of the arm 106 there is attached one end of a connecting link 108, of which the other end is attached to a bracket 110 that moves with the sleeves 86 and the first flap 34. The arrangement is such that, when the shaft 102 moves in such a way as to shift the deflector 100 from its operative position (furthest downward) to its withdrawn position (still oblique, but withdrawn upward to allow passage of product—as shown in FIG. 4), the nearer end of the arm 106 (as seen in FIG. 4) shifts downwardly to push the flap 34 into its horizontal position. When the deflector moves downwardly to its interfering position (the solid line position shown in FIG. 1), the nearer end of the arm 106 moves upwardly, swiveling the flap 34 into its withdrawn position (shown in broken lines in FIG. 4).

Located at the upper downstream portion of the second assembly 18 is a boss 112 which is fixedly supported through the structure 72. This is clearly shown in FIG. 4. The boss 112 is intended to provide a horizontal pivot axis about which the first assembly 16 can swing.

Attention is now directed to FIG. 1, wherein the first assembly 16 is shown to define a substantially flat, vertical surface 115 which is intended to close the open sides of the chambers 20 and 22 when the surface 115 is juxtaposed against the second assembly 18 with the boss 112 passing through oval openings 118 located in flanges 120.

The first assembly is shaped to define a first substantially horizontal passage 122, a second substantially horizontal passage 124 and a third substantially horizontal passage 126.

The first passage 122 is defined by an outside panel 130, an inside panel 132, a top panel 134, and a bottom panel 136. The first passage is straight and continuous between the upstream opening which can be seen in FIG. 1, and a downstream opening at the far end. The passage 122 runs substantially parallel with the panel 32.

The second passage 124 opens through the inside surface 115 of the first assembly 16 and is defined in part by a side wall 138 which angles obliquely toward the surface 115 as it extends away from the upstream opening, so that product entering the upstream opening of the second passage 124 is guided toward the second assembly 18, specifically toward the first chamber 20 with which it is substantially aligned. When the first assembly 16 is located in its position as illustrated in FIG. 2, the second passage 124 and the first chamber 20 are in alignment.

The third substantially horizontal passage 126 also opens through the surface 115, and has a side wall 142 which angles toward the surface 115 as it extends away from the upstream opening, so that product entering the upstream opening of the third passage 126 will be guided toward the second assembly 18. Although the position of the first assembly 16 illustrated in FIG. 2 is such that the third passage 126 lies too low to allow product therein to be deflected into the first chamber 20, it is possible to rotate the first assembly 16 upwardly about the boss 112 by lifting the nearer (leftward) end as pictured in FIG. 2, until the upstream opening of the passage 126 becomes aligned with the pass line 12 (see FIG. 2). To allow the selective swiveling of the first assembly 16 about the axis defined by the boss 112, the second assembly 18 has a projection 145 extending upwardly and supporting a bracket 146 having an aperture 147. A further bracket 148 is supported from the first assembly 16, and has an aperture 149. Between the brackets 146 and 148 is connected a hydraulic cylinder 150 equipped with a proportioning valve (not illustrated), allowing very precise positioning of the first assembly 16 with respect to the second assembly 18.

It should be noted that the vertical surface 115 has a lower portion 151 which is adapted to close the open side of the second chamber 22 of the second assembly 18, regardless of the adjusted position of the first assembly 16 with respect to the second assembly 18.

Attention is now directed to FIG. 2, which shows, at the right, a delivery trough cluster 152. The cluster 152 has been moved away from the assemblies 16 and 18, so that it can be seen clearly. It will be understood, however, that the cluster 152 would be positioned immediately downstream of the downstream end of the assemblies 16 and 18. As can be seen, the cluster 152 includes three upper troughs 154, 156 and 158, and a lower trough 160. It will further be recognized, from FIG. 1, that the downstream end of the first passage 122 is roughly aligned horizontally with the downstream end of the first chamber 20, these being in effect side by side. As an illustration of a possible arrangement, it may be considered that the leftward upper trough 154 leads directly to a scrap bin, that the middle upper trough 156 leads directly to a cooling bed, and that the rightward upper trough 158 leads to one or more coiling apparatuses. Further, there is a lower trough 160 which leads to a sample bin. The cluster 152 is always arranged such that the upper troughs 154, 156 and 158 are in alignment horizontally with the downstream end of the passage 122. It is intended that the mechanism comprising both assemblies 16 and 18 will be adapted to swivel about an axis shown at 162 in FIG. 1 so as to bring the downstream end of the passage 122 into registry with either trough 156 or trough 158, thus requiring the downstream end of the first chamber 20 to be in alignment with either the trough 154 or the trough 156. The downstream end of the second chamber 22 will always be in alignment with the large lower trough 160 of the cluster 152.

In order to swing the entire assembly about the axis 162, the assembly is mounted to a swivel plate 164 which in turn rests upon a suitable support. A suitable hydraulic or other means (again not illustrated) can be utilized to swing the plate 164, and thus the entire switching mechanism, about the axis 162.

Returning to FIG. 1 at the right, there is provided in the first assembly an upstream diverter flap 166, having the function of permitting a fine adjustment of the entry openings for the passages 122 and 124.

It is well known that the operation of a rotary shear 10 is such as to kick down on the tail end of the downstream section, and to kick up on the leading end of the upstream section, depending on overspeed of shear and elevation of the product running through the shear. For example, if the mechanism were arranged such that the downstream end of the fully enclosed passage 122 were in alignment with trough 156 of the cluster 152 (leading to a cooling bed), the flap 166 could be adjusted such that, as the rotary shear severs the tail end of a length of product, that tail end will be kicked upwardly above the flap 166 to enter the top passage 124, thus ending up in the chamber 20. If the flap 34 under the chamber 20 were in its closed position (i.e. not allowing communication between the chambers 20 and 22), the tail end would pass through the trough 154 of the cluster 152 which may, for example, lead to a scrap bin. Alternatively, the mechanism could be in the condition just described, with the exception that the flap 34 is withdrawn out of the way so that the chambers 20 and 22 are in communication (and so that the deflector 100 is in its lower position), whereupon the piece entering the top passage 124 will pass to the chamber 20 and then be deflected down into the chamber 22, from which it will exit through the bottom trough 160 of the cluster 152.

The purpose of the oval openings 118 is to allow the first assembly 16 to be "opened out" away from the second assembly 18 (in the manner of opening a book), so that jams can be cleared without having to disassemble the apparatus.

Finally, the apparatus includes a shear entry trough 168, having a higher vertical wall 169, a lower vertical wall 170 and a bottom wall 171. The trough 168 is pivoted about a horizontal axis 173 located near the upstream end of the shear entry trough 168, and is adjustable by an air or by hydraulic cylinder 174. The purpose of trough 168 is to control the product elevation in conjunction with the assembly 16. Product elevation when sheared determines the product nose lift height.

OPERATING MODES

Mode A, Dividing All Product to Cooling Bed

For this mode, the plate 164 is adjusted in such a way that the downstream end of the first passage 122 is in line with that one of the upper troughs of the cluster 152 that will deliver product to a cooling bed. For the sake of this and the remaining examples, it will be assumed that the upper trough 156 leads to the cooling bed, while the upper trough 158 leads to one or more coilers. Upper trough 154 leads to a bin in which scrap can be collected.

Thus, in this example the first passage 122 will deliver product to the trough 156, leading to the cooling bed. Further, the first assembly 16 is adjusted about the boss 112 so that the upstream end of the passage 122 is on the pass line 12. In this instance, the deflector 166 would be in a raised position, in which it extends upwardly and forwardly in order to block off the second passage 124, and ensure that all product enters the first passage 122. In this operational mode, all of the components (except for the shear) remain static throughout the operation.

Mode B. Tail Sample (Small Sizes), Product to Cooling Bed

For this mode, the swivel plate 164 is positioned about the vertical axis 162 such that the first passage 122 delivers product to the middle trough 156, which leads to the cooling bed. The upstream open end of the first passage 122 is again aligned with the pass line 12, but the deflector 166 is lowered to about the position shown in FIG. 2. The flap 34 located at the bottom of the first chamber 20 is in the lowered position, i.e. that shown in broken lines in FIG. 4. The shear entry trough 168 is caused to be lowered before the cut is signalled to the rotary shear 10. As a result, the actuation of the shear will uplift the leading end of the tail sample into the second passage 124. In other words, the leading end of the tail sample will be kicked up above the deflector 166, and will enter the second passage 124. As a result, the tail sample will pass into the first chamber 20, then drop down or be deflected down into the second chamber 22 (because the flap 34 is in the lowered position and the deflector 100 is in the "down" position). This will cause the tail sample to exit through the lower trough 160 of the cluster 152. After the tail sample has exited from the mechanism illustrated in the drawings, the shear entry trough 168 can be slowly raised to its normal run position, and at the same time the flap 34 at the bottom of the first chamber 20 can be slowly raised to its normal run position.

Mode C, Tail Sample (Medium and Large Sizes), Product to Cooling Bed

The swivel plate 164 is moved to the position in which the downstream end of the first passage 122 is aligned with the upper trough 156 of the cluster 152 (just as with mode B). In contrast to mode B, the first assembly 16 (with the deflector 166 in the position shown in FIG. 2) is lowered to allow only a small clearance between the running product (the main length) and the bottom side of the deflector 166. Initially, the bottom flap 34 of the first chamber 20 is in the "up" position, i.e. the solid line position shown in FIG. 4. Just before the cut is signalled to the rotary shear 10, the shear entry trough 168 is lowered. The actuation of the shear will then kick the leading end of the tail sample upwardly and into the second passage 124, i.e. above the deflector 166. It is assumed that the product is large enough in cross-section that it will actually come to a stop within the first chamber 20, and that the tail sample is shorter than the first chamber 20. The next step is that the flap 34 is slowly withdrawn, allowing the tail sample to fall down into the second chamber 22. Then, the flap 50 at the bottom of the second chamber 22 is slowly withdrawn, allowing the tail sample to fall out onto the swivel plate 164. Next, the shear entry trough 168 is slowly raised to its running position, while the flaps 34 and 50 are slowly raised to their run positions.

Mode D, Nose Sample (Small Size), Product to Cooling Bed

For this mode, the swivel plate 164 is adjusted such that the downstream end of the first passage 122 is in line with the upper trough 156 of the cluster 152, which leads to the cooling bed. The upstream end of the first assembly 16 is raised to expose the third passage 126 to the pass line 12, thus accepting the leading end of the bar or rod. For this mode, the upstream deflector 166 is in its raised position, i.e. blocking off the second passage 124. The bottom flap 34 of the first chamber 20 is in its dropped or withdrawn position, thus allowing communication between the chambers 20 and 22. The shear entry trough 168 is lowered until the product has been sheared. Then the rotary shear 10 is actuated which will have the effect of kicking the leading end of the product upwardly into the open upstream end of the first passage 122, thus causing the product to be delivered through the trough 156 to the cooling bed. The upstream end of the first assembly 16 is then lowered (about the pivot defined by the boss 112) until the product is running level into the upstream end of the first passage 122. The flap 34 is then raised into its normal run position. In this mode, the nose sample will pass from the first chamber 20 down into the second chamber 22, and out through the trough 160 to a sample bin or other suitable storage.

Mode E, Nose Sample (Medium and Large Size), Product to Cooling Bed

The swivel plate 164 is positioned as in all of the previous modes. The upstream end of the first assembly 16 is raised to bring the open upstream end of the passage 126 into registry with the pass line 12, thus accepting the leading end of the bar. The upstream deflector 166 is again in the raised position, blocking the second passage 124. The shear entry trough 168 is lowered so that the bar is delivered below the pass line 12, thus ensuring its entry into the third passage 126. When the rotary shear 10 is actuated, the product upstream of the shear will be kicked up into the first passage 122, thus exiting through trough 156 to the cooling bed. Subsequently, the shear entry trough 168 is raised to the normal run position, and the upstream end of the first assembly 16 is lowered until the product is running level into the first passage 122. When the nose sample has come to a stop within the first chamber 20, the bottom flap 34 is dropped to allow the nose sample to fall down into the second chamber 22. The bottom flap 50 of the second chamber 22 is then dropped to allow the nose sample to exit onto the plate 164. Thereafter, the two flaps 34 and 50 are raised back into the horizontal position.

Mode F, Mid-bar Sample (Small Product), Product to Cooling Bed

As with all previous modes, the swivel plate 164 is set so that the downstream end of the first passage 122 is in alignment with the middle upper trough 156 of the cluster 152. The product is running directly into the first passage 122 which is aligned with the pass line, and the deflector 166 is lowered to the position shown in FIG. 2. The upstream end of the first assembly 16 is lowered to allow a small clearance between the top of the running product and the bottom side of the deflector 166. The flap 34 at the bottom of the first chamber 20 is in the dropped position. The shear entry trough 168 is lowered before the cut is signalled to the rotary shear 10. This means that the shear when actuated will uplift the leading end of the sample into the second passage 124. The first assembly 16 is then quickly raised, and the shear entry trough 168 is also quickly raised. The rotary shear 10 is then again actuated to cut the product whereupon the uplifted leading end is directed into the first passage 122. The first assembly is then quickly lowered, and the shear entry trough 168 is also quickly lowered. The flap 34 is then raised to its horizontal position. This mode will cause the mid-bar sample to exit from the second chamber 22 through the trough 160 of the cluster 152.

Mode G, Mid-bar Sample (Medium and Large Size), Product to Cooling Bed

The swivel plate 164 is again positioned as in all previous modes.

The product runs in passage 122 on the pass line 12 with the upstream deflector 166 lowered, and the leading end of the first assembly 16 lowered to allow a small clearance between the top of the running product and the bottom side of the deflector 166. The flap 34 of the first chamber 20 is in the dropped position. The shear entry trough 168 is lowered before the cut is signalled to the rotary shear 10. The rotary shear 10 is then actuated to cut and uplift the leading end of the sample so that it is directed into the second passage 124. The upstream end of the first assembly 16 is then raised quickly to expose passage 122 to the leading end. The shear entry trough 168 is then quickly raised, and the rotary shear 10 is actuated to complete the cutting of the mid-bar sample, and to kick the leading end of the following product up into the first passage 122. Following this, the first assembly 16 is quickly lowered, as is the shear entry trough 168. The bottom flap 50 for the second chamber 22 is lowered to the drop position, to allow the mid-bar sample to fall out onto the swivel plate 164. Then, both of the flaps 34 and 50 are raised to the horizontal position.

Mode H, Nose Trim, Product to Cooling Bed, Trim to Trough 154

For this mode, the swivel plate 164 is positioned as will all of the previous modes. The leading end of the first assembly 16 is raised to align the leading end of the product with the third passage 126. The flap 34 is in the raised position (as is the deflector 100). The shear entry trough 168 is lowered before the signal is sent to the rotary shear 10, and the shear cut is made. This will cause the main portion of the product to be kicked up in to the first passage 122 and thus to exit through trough 156 to the cooling bed. However, the nose trim will pass into the first chamber 20 and then out through the trough 154 of the cluster 152. The upstream end of the first assembly 16 is then lowered, and the shear entry trough 168 is raised.

Mode I, Tail Trim, Product to Cooling Bed, Trim to Trough 154

The swivel plate 164 is again aligned as in all previous modes. The product is running through the first passage 122 with the upstream deflector 166 lowered to about the position shown in FIG. 2. The flap 34 is in the raised position. The shear entry trough 168 is lowered before the cut is signalled to the rotary shear 10, and the shear cut is made. This will cause the trim to kick up into the second passage 124 and be guided into the first chamber 20. Thereafter, the shear entry trough 168 is raised to the run position. Because the flap 34 remains in the raised position, the tail trim will pass through the trough 154 of the cluster 152.

Mode J, Nose Trim, Product to Coilers, Trim to Cooling Bed

For this mode, the swivel plate 164 is adjusted so that the downstream end of the first passage 122 is in alignment with the trough 158, leading to the coilers. This will mean that the downstream end of the first chamber 20 is in alignment with the trough 156, leading to the cooling bed. The first assembly 16 is raised to the position in which the leading end of the product enters the upstream end of the third passage 126. The flap 34 at the bottom of the first chamber 20 is in the raised position. The upstream deflector 166 is in the raised position, where it blocks off the second passage 124. The shear entry trough 168 is lowered, and the shear cut is made. This will cause the main portion of the product to kick up into the first passage 122. Then the upstream end of the first assembly 16 is lowered to align the first passage 122 with the product (with the pass line 12). The shear entry guide is then raised. In this mode, because the downstream end of the first chamber 20 is in alignment with the trough 156 (rather than with the trough 154), the trim will pass to the cooling bed.

Mode K, Tail Trim: Product to Coilers, Trim to Cooling Bed

The swivel plate 164 is positioned as in the previous mode J, so that the downstream end of the first passage 122 is in alignment with the trough 158, leading to the coilers. Product is running in passage 122, with the upstream deflector 166 lowered to its position shown in FIG. 2. The flap 34 at the bottom of the first chamber 20 is in the raised position (horizontal position). The shear entry trough 168 is lowered before the cut is signalled to the rotary shear 10, and the shear cut is made. This will cause the tail trim to be kicked up into the second passage 124, and (because the flap 34 is horizontal) to exit through the trough 156 leading to the cooling bed. Once the tail trim has started into the second passage 124, the shear entry trough 168 is raised to its normal running position.

Mode L, Tail Sample, Product to Coiler

The swivel plate 164 is positioned as with mode K. Product is running through the first passage 122, with the upstream deflector 166 lowered to its position shown in FIG. 2. The flap 34 at the bottom of the first chamber 20 is in the dropped position. The shear entry trough 168 is lowered before the cut is signalled to the rotary shear 10, and the shear cut is made. This will kick the leading end of the tail sample up into the second passage 124, from where it will fall down into the second chamber 22 and pass out through the trough 160 of the cluster 152. Thereupon, the shear entry trough 168 is raised, and the flap 34 is raised back into the horizontal position.

Mode N, Terminate Delivery to Coilers (Divert to Bed)

For this mode, the swivel plate 164 is again positioned as in mode K and L. Product is running through the first passage 122, and the upstream deflector 166 is lowered into the position shown in FIG. 2. The flap 34 at the bottom of the first chamber 20 is in the raised (horizontal position). The shear entry trough 168 is lowered before the cut is signalled to the rotary shear 10, and the shear cut is made. This will kick the following portion of the product up into the second passage 124. Because the flap 34 is in the horizontal position and the deflector 100 is up out of the way, the rest of the product will pass through the trough 156 to the cooling bed. After this, the shear entry trough 168 is raised to the run position, and the upstream end of the first assembly 16 is lowered to align the second passage 124 with the pass line 12. Further cuts are initiated as required. After the product has passed through the mechanism, the upstream end of the first assembly 16 can be raised so that the first passage 122 is in line with the pass line 12.

Mode O, Divert Entire Bar From Coilers to Bed

For this mode, the swivel plate 164 is positioned as in mode N, and the flap 34 at the bottom of the first chamber 20 is in the raised (horizontal) position. The upstream end of the first assembly 16 is raised to expose the upstream end of the third passage 126 to the pass line. This will divert the entire bar from the third passage 126 into the first chamber 20 and through the trough 156 to the cooling bed. After the product has passed through, the mechanism can be returned to its normal run position.

Mode P, Mid-bar Sample, on Coils

For this mode, the swivel plate 164 is positioned as with mode O. The product is running through the first passage 122 on the pass line 12, with the upstream deflector 166 lowered, and the first assembly 16 adjusted so that there is only a small clearance between the top of the running product and the bottom side of the upstream deflector 166. The flap 34 at the bottom of the chamber 20 is in the dropped or withdrawn position (broken lines in FIG. 4). The shear entry guide 168 is lowered before as the cut is signalled to the rotary shear 10. The shear then cuts the product, and kicks the leading end of the subsequent sample into the second passage 124. The sample will then enter the first chamber 20 and pass down to the second chamber 22, exiting through the trough 160 of the cluster 152. The upstream end of the first assembly 16 is then quickly raised as is the shear entry trough 168. The rotary shear 10 is then again actuated to cut the product whereupon the uplifted leading end is directed into the first passage 122. The upstream end of the first assembly 16 is then lowered to align the first passage 122 with the pass line 12 once the leading end of the product trailing the sample is trapped and the shear entry trough 168 is also quickly lowered. The flap 34 is then raised to its horizontal position. This mode will cause the mid-bar sample to exit from the second chamber 22 through the trough 160 of the cluster 152.

Mode O, Dividing on Coils

For this mode, the swivel plate 164 is adjusted as with mode P. The upstream end of the first assembly 16 is lined up so that the upstream end of the first passage 122 is on the pass line 12, and the upstream deflector 166 is in the up position, blocking off the second passage 124, ensuring all product enters the first passage 122. In the operational mode, all of the components (except for the shear) remain static throughout the operation.

While one embodiment of this invention has been illustrated in the accompanying drawings and described hereinabove, it will be evident to those skilled in the art that changes and modifications can be made therein, without departing from the essence of this invention, as set forth in the appended claims.

The embodiments of the invention in which an exclusive property or privilege is claimed are defined as follows:

1. For use with a rotary shear for rod and bar product, a product switching mechanism comprising:
   first means providing a substantially horizontally elongate chamber, defined by a top wall, a bottom wall and one side wall, the chamber being open at the side opposite said one side wall, said chamber having one end remote from the rotary shear and another end adjacent the rotary shear, said one end being open,
   second means defining a substantially flat, vertical surface closing the open side of said chamber, the second means further providing first and second substantially horizontal passages, the first passage being enclosed above, below and on either side and having a downstream opening and an upstream opening, the second passage having an upstream opening vertically adjacent the upstream opening of the first passage, the second passage opening through said surface of the second means and having a side wall angling toward said surface as it extends away from the upstream opening of the second passage, so that product entering the upstream opening of the second passage is guided toward said first means, the second means being selectively movable with respect to the first means to a position which is such that product moving in said second passage is guided into said chamber.

2. The product switching mechanism claimed in claim 1, in which said second means further provides a third substantially horizontal passage, the third passage having an upstream opening vertically adjacent the upstream opening of the first passage, the third passage also opening through said surface of the second means and having a side wall angling toward said surface as it extends away from the upstream opening of the third passage, so that product entering the upstream opening of the third passage is guided toward said first means, the second means being selectively movable with respect to the first means to a position which is such that product moving in said third passage is guided into said chamber.

3. The product switching mechanism claimed in claim 2, in which the upstream opening of the second passage lies above that of the first passage, and the upstream opening of the first passage lies above that of the third passage.

4. The product switching mechanism claimed in claim 1, which further comprises a delivery trough cluster at the end of the switching mechanism which is remote from the rotary shear, the delivery trough cluster including a first upper trough adapted to receive product from the downstream end of said chamber, and a second upper trough adapted to receive product from the downstream end of said first passage.

5. The product switching mechanism claimed in claim 4, which further comprises third means providing a further substantially horizontally elongate chamber adjacently below said first mentioned chamber, a flap between the two chambers, the flap being movable between 1) a first position in which it defines the bottom wall of said first-mentioned chamber and a top wall of said further chamber, the flap thus separating the two chambers, and 2) a second position in which it allows communication between the chambers so that product in the first-mentioned chamber can drop down into said further chamber, the further chamber being further defined by a side wall and a bottom wall, the further chamber being open at the side opposite its said side wall, said vertical surface of the second means also closing the open side of said further chamber.

6. The product switching mechanism claimed in claim 5, further comprising a further flap defining said bottom wall of said further chamber, said further flap being movable between 1) a first position in which it closes the bottom of said further chamber, and 2) a second position in which the bottom of the further chamber is open, so that product therein can fall out through the open bottom.

7. The product switching mechanism claimed in claim 4, in which the delivery trough cluster further includes a third upper trough in horizontal alignment with said first and second upper troughs, said product switching mechanism further including swivel means having a substantially vertical axis adjacent the rotary shear, about which axis said first and second means can swivel with respect to said delivery trough cluster so that the downstream ends of said first passage and said chamber can be selectively placed adjacent different ones of said upper troughs.

8. The product switching mechanism claimed in claim 5, in which said further chamber has a downstream end remote from the rotary shear, which downstream end is open, the delivery trough cluster further including a lower trough positioned so as to be in alignment with said downstream end of the further chamber, said flap being operatively connected with a deflector means located within the downstream end of the first-mentioned chamber, said deflector means assuming an operative position in which it guides product downwardly from said first-mentioned chamber into said further chamber whenever said flap is in its second position, and assuming an inoperative position in which it allows product to remain in said first-mentioned chamber whenever said flap is in its first position.

9. The product switching mechanism claimed in claim 1, in which said second means further includes a diverter flap mounted thereon for swiveling movement, about a substantially horizontal axis, between a first position in which it blocks access to said second passage and guides product into said first passage, and a second position in which it allows access to said second passage.

10. The product switching mechanism claimed in claim 3, in which said second means further includes a diverter flap mounted thereon for swiveling movement, about a substantially horizontal axis, between a first position in which it blocks access to said second passage and guides product into said first passage, and a second position in which it allows access to said second passage.

11. The product switching mechanism claimed in claim 4, in which said second means further includes a diverter flap mounted thereon for swiveling movement, about a substantially horizontal axis, between a first position in which it blocks access to said second passage and guides product into said first passage, and a second position in which it allows access to said second passage.

12. The product switching mechanism claimed in claim 6, in which said second means further includes a diverter flap mounted thereon for swiveling movement, about a substantially horizontal axis, between a first position in which it blocks access to said first passage and guides product into said second passage, and a second position in which it allows access to said first passage.

13. The product switching mechanism claimed in claim 1, in which said second means is mounted for swiveling movement about a substantially horizontal axis adjacent the downstream ends of said passages, the second means having adjusting means by which it can be placed in any of a plurality of rotational positions about said last-mentioned axis, thus allowing the upstream ends of said passages to be selectively positioned vertically with respect to said rotary shear.

14. The product switching mechanism claimed in claim 2, in which said second means is mounted for swiveling movement about a substantially horizontal axis adjacent the downstream ends of said passages, the second means having adjusting means by which it can be placed in any of a plurality of rotational positions about said last-mentioned axis, thus allowing the upstream ends of said passages to be selectively positioned vertically with respect to said rotary shear.

15. The product switching mechanism claimed in claim 3, in which said second means is mounted for swiveling movement about a substantially horizontal axis adjacent the downstream ends of said passages, the second means having adjusting means by which it can be placed in any of a plurality of rotational positions about said last-mentioned axis, thus allowing the upstream ends of said passages to be selectively positioned vertically with respect to said rotary shear.

16. The product switching mechanism claimed in claim 6, in which said second means is mounted for swiveling movement about a substantially horizontal axis adjacent the downstream ends of said passages, the second means having adjusting means by which it can be placed in any of a plurality of rotational positions about said last-mentioned axis, thus allowing the upstream ends of said passages to be selectively positioned vertically with respect to said rotary shear.

17. The product switching mechanism claimed in claim 6, in which said further chamber has a downstream end remote from the rotary shear, which downstream end is open, the delivery trough cluster further including a lower trough positioned so as to be in alignment with said downstream end of the further chamber, said flap being operatively connected with a deflector means located within the downstream end of the first-mentioned chamber, said deflector means assuming an operative position in which it guides product downwardly from said first-mentioned chamber into said further chamber whenever said flap is in its second position, and assuming an inoperative position in which it allows product to remain in said first-mentioned chamber whenever said flap is in its first position.

18. The product switching mechanism claimed in claim 16, in which said further chamber has a downstream end remote from the rotary shear, which downstream end is open, the delivery trough cluster further including a lower trough positioned so as to be in alignment with said downstream end of the further chamber, said flap being operatively connected with a deflector means located within the downstream end of the first-mentioned chamber, said deflector means assuming an operative position in which it guides product downwardly from said first-mentioned chamber into said further chamber whenever said flap is in its second position, and assuming an inoperative position in which it allows product to remain in said first-mentioned chamber whenever said flap is in its first position.

* * * * *